United States Patent
Cammack

(10) Patent No.: US 6,680,582 B1
(45) Date of Patent: Jan. 20, 2004

(54) SYSTEM AND METHOD FOR EMPLOYING PULSE WIDTH MODULATION FOR REDUCING VERTICAL SEGREGATION IN A GAS DISCHARGE LAMP

(75) Inventor: David Alan Cammack, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 75 days.

(21) Appl. No.: 09/684,196

(22) Filed: Oct. 6, 2000

(51) Int. Cl.$^7$ .............................................. H05B 37/02
(52) U.S. Cl. ........................ 315/224; 315/291; 315/307; 315/246
(58) Field of Search ................ 315/291, 307, 315/224, 247, 209 R, 244, 225, 246

(56) References Cited

U.S. PATENT DOCUMENTS

| | | | |
|---|---|---|---|
| 4,137,484 A | * 1/1979 | Osteen | 313/634 |
| 4,373,146 A | * 2/1983 | Bonazoli et al. | 315/174 |
| 5,270,620 A | 12/1993 | Basch et al. | 315/291 |
| 5,306,987 A | * 4/1994 | Dakin et al. | 313/517 |
| 5,365,151 A | 11/1994 | Spiegel et al. | 315/209 |
| 5,508,592 A | * 4/1996 | Lapatovich et al. | 315/248 |
| 5,623,187 A | * 4/1997 | Caldeira et al. | 315/209 R |
| 5,684,367 A | 11/1997 | Moskowitz et al. | 315/246 |
| 6,005,356 A | * 12/1999 | Horiuchi et al. | 315/176 |
| 6,184,633 B1 | * 2/2001 | Kramer | 315/246 |

FOREIGN PATENT DOCUMENTS

| | | | | |
|---|---|---|---|---|
| WO | WO9908492 | 2/1999 | | H05B/41/392 |

* cited by examiner

*Primary Examiner*—Vanessa Clark
*Assistant Examiner*—Ephrem Alemu

(57) ABSTRACT

A system for driving a gas discharge lamp includes a bridge circuit providing a pulse voltage signal, a controller which generates a pulse width modulated signal corresponding to a desired waveform. A filter circuit receives and filters the pulse voltage signal to provide this to the lamp. The pulse width modulated signal corresponds to the desired waveform, and includes a sweeping frequency signal and a fixed frequency amplitude modulated signal.

20 Claims, 9 Drawing Sheets

SYSTEM AND METHOD FOR EMPLOYING PULSE WIDTH MODULATION FOR REDUCING VERTICAL SEGREGATION IN A GAS DISCHARGE LAMP

FIELD OF THE INVENTION

This invention relates to a system for driving a gas discharge lamp and more specifically to a system employing pulse width modulation for reducing color segregation in high intensity gas discharge lamps.

BACKGROUND OF THE INVENTION

High intensity discharge lamps (HID) are becoming increasingly popular because of their many advantages, such as efficiency and light intensity. These HID lamps are driven by either a high frequency electronic ballast that is configured to generate driving current signals at above 20 Khz range or by a low frequency electronic ballast with driving current signals in the 100 Hz range.

A major obstacle to the use of high frequency electronic ballasts for HID lamps, however, is the acoustic resonances/arc instabilities which can occur at high frequency operation. Acoustic resonances, at many instances, can cause flicker of the arc which is very annoying to humans. Furthermore, acoustic resonance can cause the discharge arc to extinguish, or even worse, stay permanently deflected against and damage the wall of the discharge lamp.

Recently, a new class of high intensity discharge lamps has been developed that employ ceramic (polycrystalline alumina) envelopes. The discharge envelope in this class of lamps is cylindrical in shape, and the aspect ratio, i.e., the inner length divided by the inner diameter is close to one, or in some instances more than one. Such lamps have the desirable property of higher efficacy, but they have the disadvantage of having different color properties in vertical and horizontal operation. In particular, in vertical operation color segregation occurs.

The color segregation can be observed by projecting an image of the arc onto a screen, which shows that the bottom part of the arc appears pink, while the top part appears blue or green.

This is caused by the absence of complete mixing of the metal additives in the discharge. In the upper part of the discharge there is excessive thallium emission and insufficient sodium emission. This phenomena leads to high color temperature and decreased efficacy.

U.S. application Ser. No. 09/335,020 entitled Reduction of Vertical Segregation In a Discharge Lamp, filed Jun. 17, 1999, now U.S. Pat. No. 6,184,633, and incorporated herein by reference, teaches a method to eliminate or substantially reduce acoustic resonance and color segregation, by providing a current signal frequency sweep within a sweep time, in combination with an amplitude modulated signal having a frequency referred to as second longitudinal mode frequency. The typical parameters for such operation are a current frequency sweep from 45 to 55 kHz within a sweep time of 10 milliseconds, a constant amplitude modulation frequency of 24.5 KHz and a modulation index of 0.24.

The modulation index is defined as $(V_{max}-V_{min})/(V_{max}+V_{min})$, where $V_{max}$ is the maximum peak to peak voltage of the amplitude modulated envelope and $V_{min}$ is the minimum peak to peak voltage of the amplitude modulated envelope. The frequency range of 45 to 55 KHz is between the first azimuthal acoustic resonance mode and the first radial acoustic resonance mode. The second longitudinal mode can be derived mathematically, where the power frequency of the $n^{th}$ longitudinal mode is equal to $n*C_1/2L$ where n is the mode number, $C_1$ is the average speed of sound in the axial plane of the lamp and L is the inner length of the lamp.

In terms of setting up a lamp driving system, it is relatively convenient to provide an arrangement of signal generators in a laboratory environment to produce the desired waveform signal that includes amplitude modulation at the second longitudinal mode frequency and the current signal sweep frequency. However, there is a need for a practical driver configuration in a lamp power converter that provides the required driving signal to the lamp in a convenient and efficient manner.

SUMMARY OF THE INVENTION

Thus, in accordance with one embodiment of the invention, a high intensity discharge lamp is driven by an electronic ballast that includes a ballast bridge unit having a full-bridge or a half-bridge configuration, that is controlled by a pulse width modulated (PWM) signal generator. The pulse width modulated signal generator provides a pulse width modulated signal that is derived from a lamp drive voltage waveform having the desired characteristics as required for eliminating color segregation in the lamp. This signal controls the operation of the bridge. The output signal provided by the ballast bridge unit is then provided to a low pass filter, which is employed to filter the undesired frequency components generated by the pulse width modulated signal, as well as to ballast the lamp.

In accordance with another embodiment of the invention, a controller module is employed to first determine the second longitudinal mode frequency that corresponds to the second longitudinal mode of the discharge lamp and then to provide the pulse width modulated signal provided by the pulse width modulated signal generator. The controller module includes a microprocessor configured to receive feedback voltage and current signals from the driven high intensity discharge lamp. The controller also includes an AM/FM signal generator that provides the desired lamp drive voltage waveform. As described before, the lamp drive voltage waveform includes an amplitude modulated signal having a frequency equal to the second longitudinal mode frequency of the discharge lamp in combination with a frequency swept signal.

The lamp drive voltage waveform provided by the AM/FM signal generator is then fed to the pulse width modulated signal generator. When operating in the symmetrical mode, the pulse width modulated signal generator provides a symmetrical triangular pulse modulating signal that is compared with the drive voltage waveform via a comparator. When operating in the asymmetrical mode, the pulse width modulated signal generator provides a triangular signal having a one sided ramp. The output port of the pulse width modulated signal generator provides a gate drive signal to operate the bridge module.

In accordance with another embodiment of the invention all the components of the controller module are implemented in analog and/or digital circuit configurations. The pulse width modulated signal provided by the bridge circuit drives the lamp via a low pass filter circuit. Advantageously the resonance frequency of the low pass filter falls within a range above any of the frequency components of the voltage spectrum of the desired lamp drive waveform, and one third of the resonant frequency falls between the swept frequency range and the full range of the possible second longitudinal mode frequency range.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may be best understood by reference to the following detailed description when read with the accompanying drawings in which:

DETAILED DESCRIPTION OF THE DRAWINGS

Figure 1:
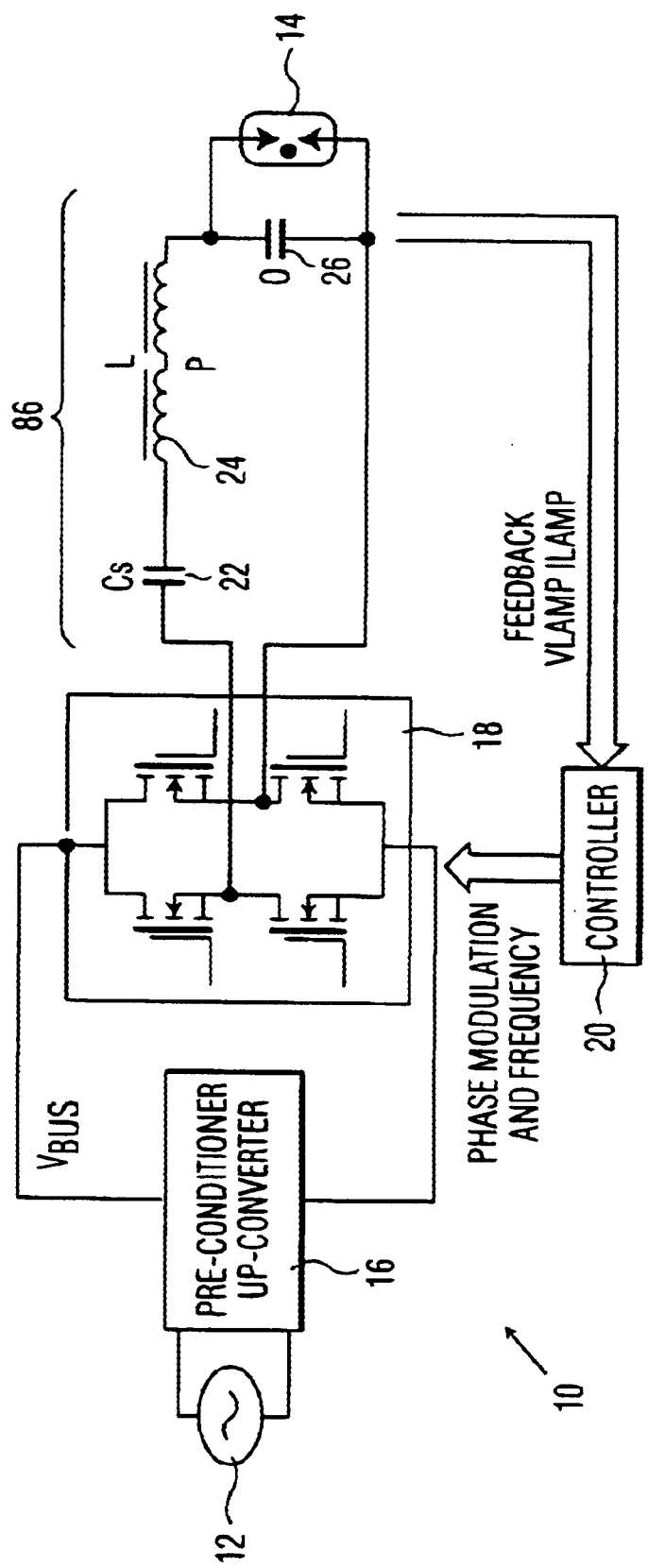
FIG. 1 illustrates an electronic ballast circuit, in accordance with one embodiment of the present invention.

FIG. 1 illustrates an electronic ballast circuit 10 in accordance with one embodiment of the invention. Mains power supply 12 provides an AC current signal to a high and low voltage supply bus, $V_{Bus}$ that is ultimately employed to drive lamp 14. Ballast circuit 10 includes a pre-conditioner and up converter 16, which is configured to receive a rectified version of the mains power supply signal and shape the ballast supply current, also referred to as mains current, for power factor correction. Advantageously pre-conditioner and up-converter 16 includes a boost converter (not shown), whose operation is well known in the art.

A ballast bridge unit 18 is configured to receive the signal provided by pre-conditioner, and up-converter unit 16. Ballast bridge unit 18 functions as commutator that alternates the polarity of voltage signal provided to lamp 14 via filter circuit 86. Ballast bridge unit 18 comprises four MOSFET transistors that are switched to provide alternating signal paths for the signal carried in the power voltage signal buses $V_{Bus}$.

Ballast bridge unit 18 is controlled by a controller 20, that provides corresponding signals to the gates of the MOSFETS in the ballast bridge unit. The output port of the ballast bridge unit is coupled to a high intensity discharge (HD) lamp 14 via filter circuit 86 comprising a capacitor 22, an inductor 24 coupled in series to a capacitor 26, which is coupled in parallel to lamp 14. A feedback voltage and current signal line is provided from lamp 14 to controller 20.

In accordance with one embodiment of the invention, high intensity discharge lamp 14 is operated by a current frequency sweep within a sweep time, in combination with an amplitude modulated signal that has a second longitudinal mode frequency corresponding to the second longitudinal acoustic resonance mode of the discharge lamp. The second longitudinal mode frequency, $w_m$, is derived by first setting a lower limit second longitudinal mode frequency $w_L$, and an upper limit second longitudinal mode frequency $w_H$. The gas discharge lamp is then provided with a current signal that has a frequency sweep ranging between the first azimuth acoustic resonance mode frequency and the first radial acoustic resonance mode frequency, respectively corresponding to the first azimuth acoustic resonance mode of the lamp and the first radial acoustic resonance mode of the lamp.

The frequency swept current signal is then mixed with an amplitude modulated signal having frequency $w_m$ and a specified modulation index m (typically 0.09). The goal is to provide a voltage wave form at the lamp defined by equation (1):

$$V(t) = A(1 + m \cos w_m t) \cos W_c(t) t$$

where m is modulation index of said modulating signal, $W_m$ is the modulation frequency, $W_c(t)$ is the carrier frequency, t is time, and A is an amplitude. The modulation frequency falls, within a 20–30 kHz range, while the carrier frequency is typically centered at about 50 kHz and swept about + or −5 kHz, at a rate that is very slow compared to either tile carrier frequency or the modulation frequency. The lamp voltage is then measured. The amplitude modulated frequency $w_H$ is then increased by a specified amount $\Delta f$ and then mixed again with the frequency swept current signal. The lamp voltage is repeatedly measured until the frequency of the amplitude modulated signal reaches $w_L$. A frequency vs. voltage curve is generated from $w_H$ to $w_Y$. The maximum in the lamp voltage corresponds to the frequency $w_{max}$, which is then utilized for color mixing, that is when $W_m$ is set to $w_{max}$.

In accordance with another embodiment of the invention, every time that the frequency swept signal is mixed with the amplitude modulated signal and a voltage measurement is taken, the amplitude modulated signal is turned "off" until the following voltage measurement.

In accordance with yet another embodiment of the invention a background subtraction mechanism is employed. To this end, the lamp voltage measurements are performed such that the lamp voltage signal values with amplitude modulation "off" before and after mixing the amplitude modulated signal with the swept frequency signal, are averaged and subtracted from the lamp voltage with amplitude modulation mixing "on."

Once the color mixing frequency $w_{max}$ is determined, the frequency swept signal is mixed with an amplitude modulated signal having a frequency $w_H$ again. The amplitude modulation frequency is then decreased to frequency, $w_{max}$ and the modulation index m is increased to $m_{mix}$, which is a modulation index to be employed in color mixing mode (typically 0.24).

Figure 2A:
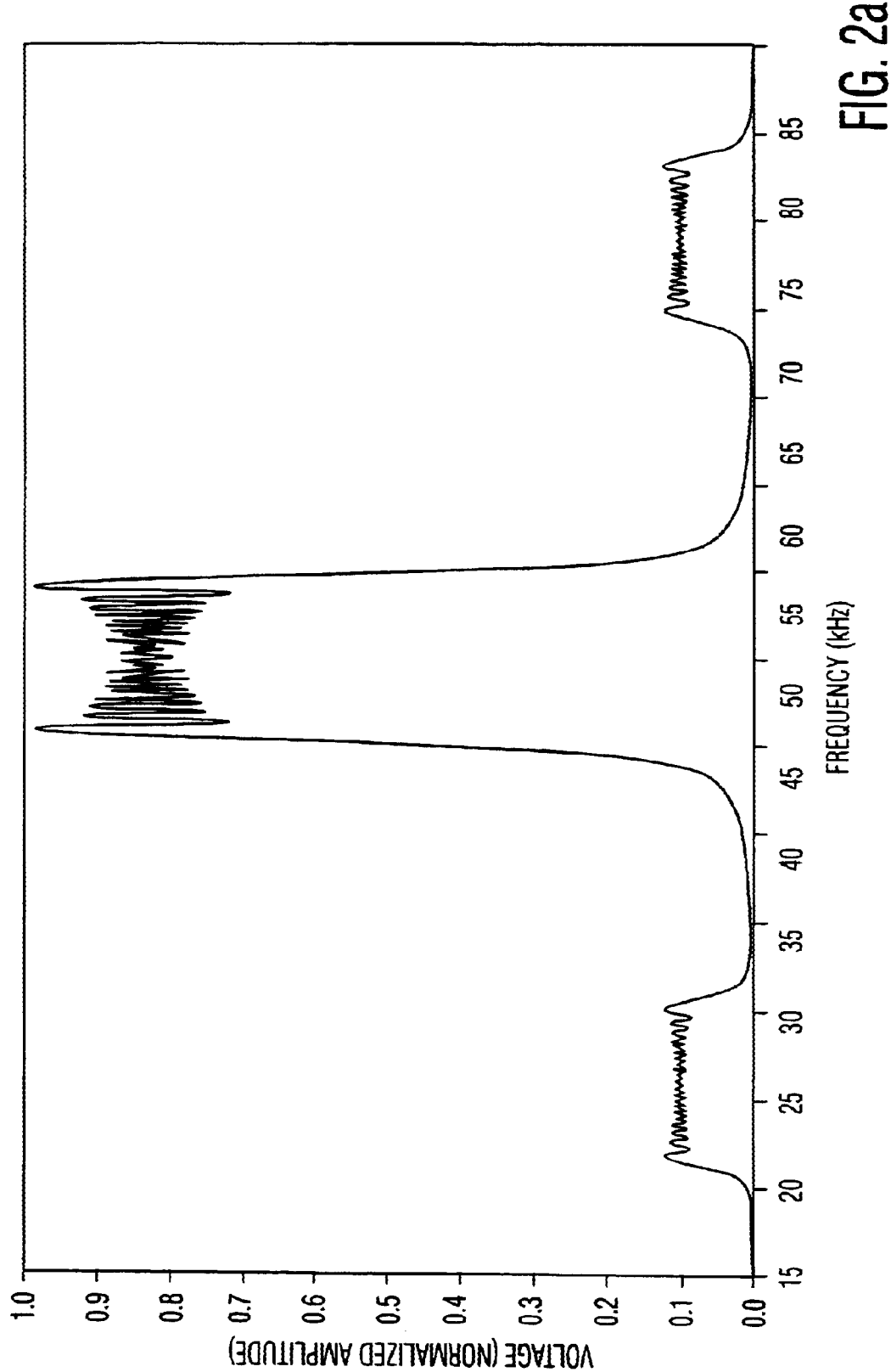
FIG. 2a, 2b and 2c illustrate the frequency spectrum for an amplitude modulated signal provided by the system, in accordance with one embodiment of the present invention.
Figure 2B:
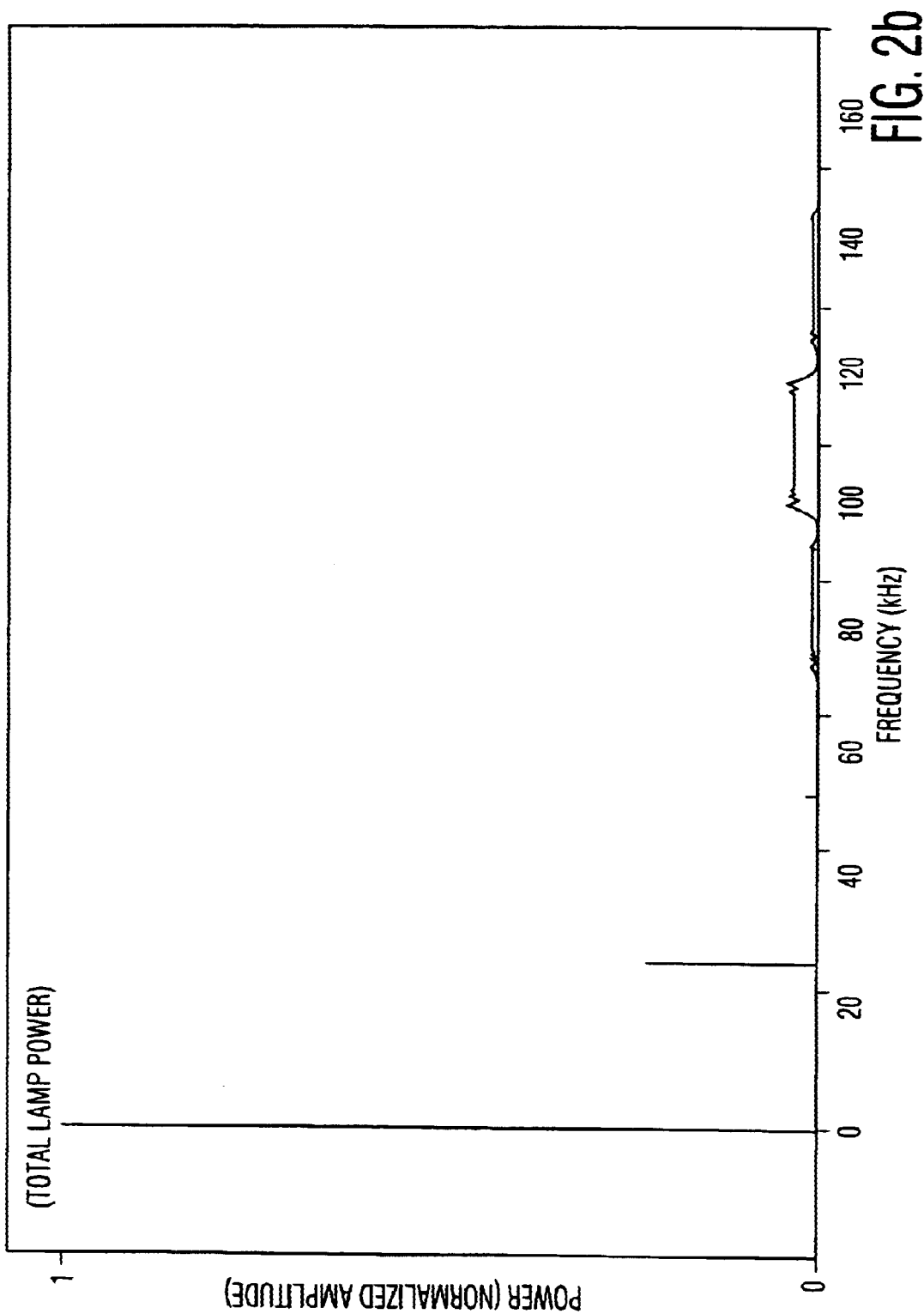

FIGS. 2a and 2b illustrate the frequency spectrum for an amplitude modulated signal provided by system 10 in accordance with one embodiment of the invention. Thus, FIG. 2a illustrates a voltage frequency vs. relative voltage graph of the amplitude modulated signal. In accordance with one embodiment of the invention, the sweep generator 12 provides a frequency swept signal ranging from 45 to 55 kHZ as illustrated in FIG. 2a. The amplitude modulation signal provided by generator 94 has a frequency of 24 kHZ and a modulation index of 0.24. As such the resultant signal at the output port of bridge 18 has a voltage frequency characteristics as depicted in FIG. 2a, wherein a center distribution between 45–55 kHZ and two sidebands at 26 kHz and 74 kHz exist.

Figure 2C:
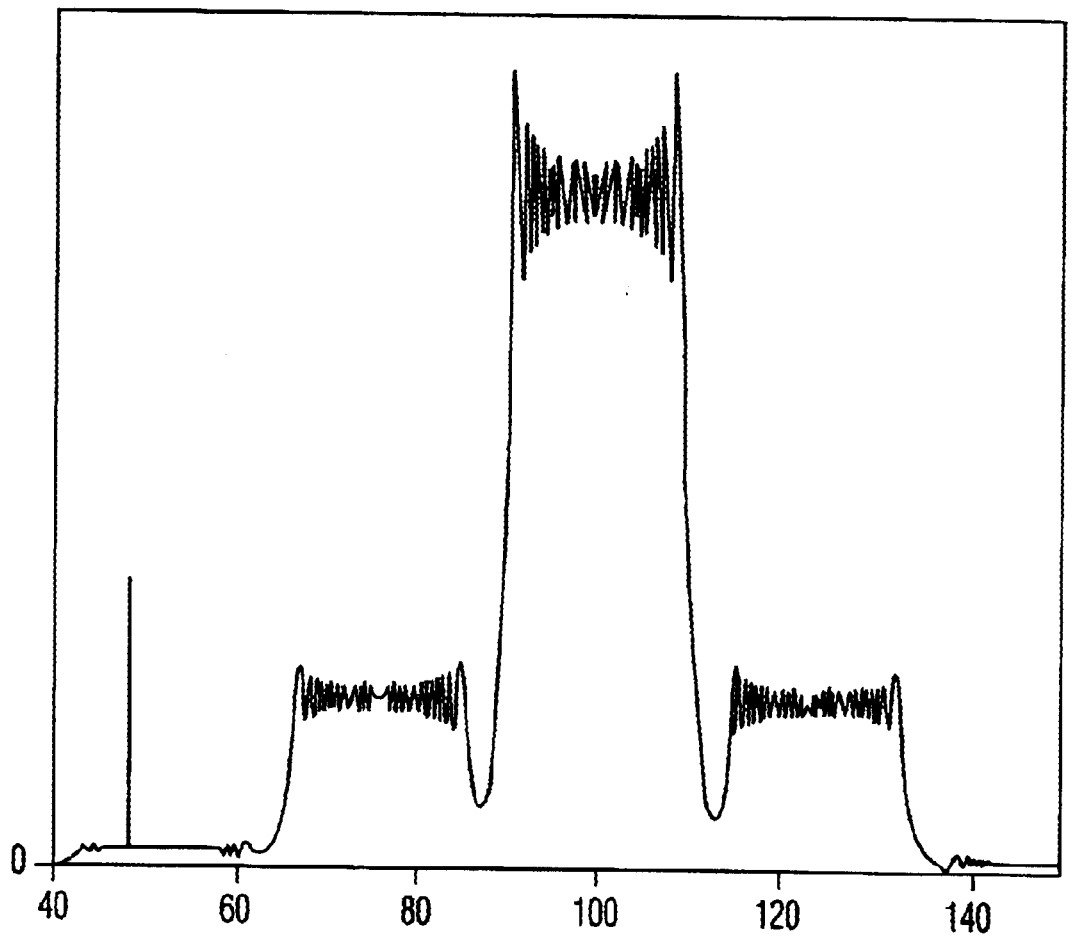

FIG. 2b represents the power frequency distribution, wherein a center distribution ranging from 90 kHz to 110 kHz and two sidebands at 76 kHz and 124 kHz exist along a fixed power frequency at the second longitudinal mode frequency of 24 kHz. FIG. 2c represents the same information as presented in FIG. 2a with a focus on the frequency range from 40 kHz–160 kHz.

Figure 3:
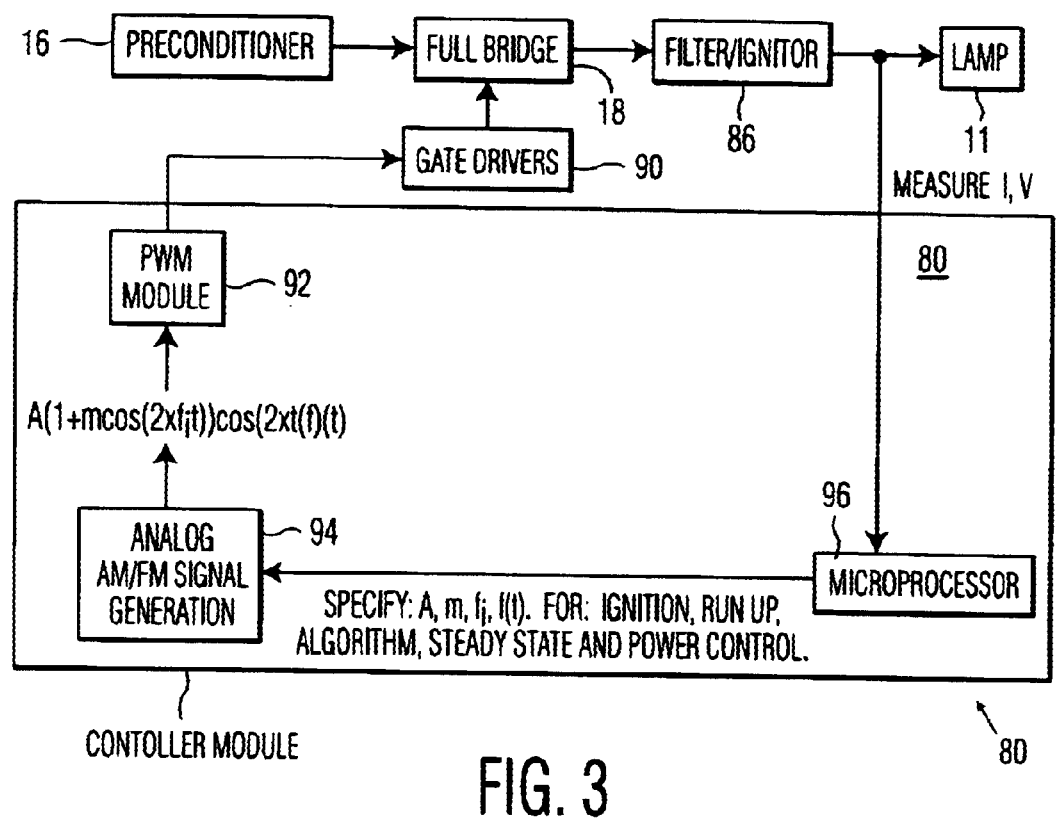
FIG. 3 illustrates a block diagram of a ballast system, in accordance with one embodiment of the present invention.

FIG. 3 illustrates a block diagram of a ballast system 80 in accordance with one embodiment of the invention. As explained with reference to FIG. 1, the lamp drive waveform is created by employing full bridge circuit 18 which provides the driving signal to lamp 14 via a filter/ignitor circuit 86. The MOSFETS contained in full bridge circuit 18 are driven by control signals generated by controller 20 and provided via gate driver circuit 90. In accordance with one embodiment of the invention, gate driver circuit 90 functions as an interface between controller 20 and full bridge circuit 18.

Controller 20 includes a microprocessor 96 which is configured to receive at its input port voltage and current measurement signals corresponding to the voltage and current signals provided to lamp 14. Microprocessor 96 performs the color mixing algorithm discussed above in reference with FIGS. 1 and 2. To that end, an output port of microprocessor 96 is coupled to an input port of an AM/FM signal generator 94, so as to provide the necessary signals for appropriate color mixing during the operation of the lamp. AM/FM signal generator 94 is configured to provide a small signal version of the waveform defined in equation (1) above. An output port of signal generator 94 is coupled to an input port of a pulse width modulation module 92. Pulse width modulation module 92 is configured to generate a pulse signal corresponding to the waveform signal provided by generator 94. The output port of pulse width modulation module 92 is coupled to gate driver circuit 90.

Figure 4:
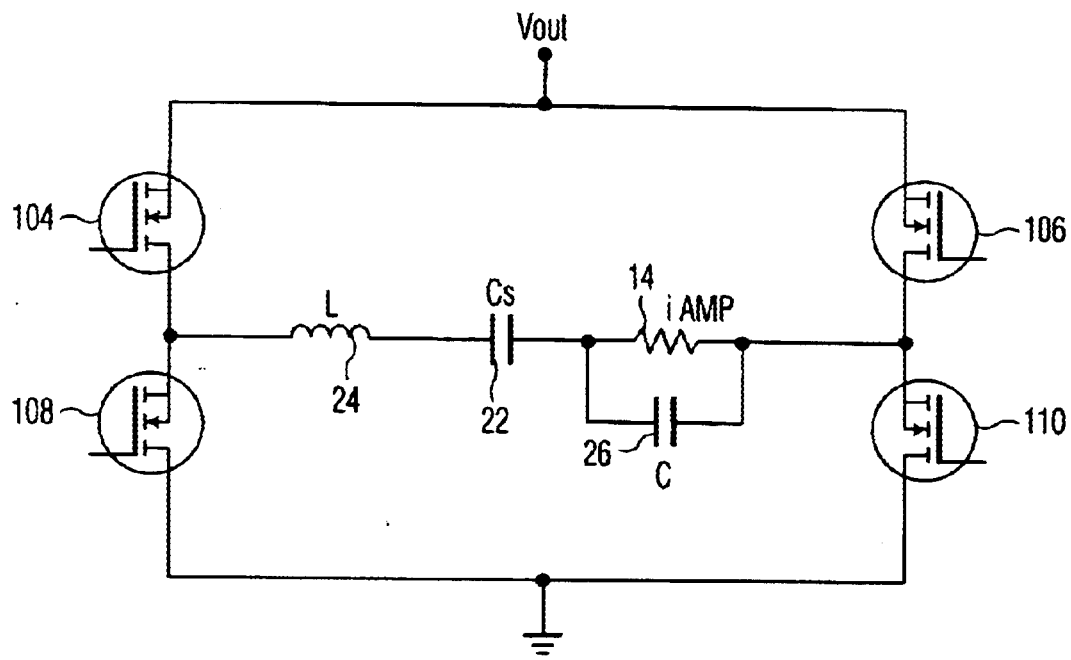
FIG. 4 illustrates one arrangement of a full bridge circuit in combination with a filter/ignitor, in accordance with one embodiment of the present invention.

FIG. 4 illustrates one arrangement of full bridge circuit 18 in combination with filter/ignitor 86, in accordance with an embodiment of the invention. MOSFETS 104 through 110 are coupled together to form a full bridge circuit as commonly known in the art. Inductor 24 has an inductance L, and capacitors 22 and 26 have capacitances Cs and C respectively. The output signal provided by full bridge circuit 18 is an approximation of the desired waveform in addition to higher frequency components. Thus, one requirement for the filter is that it sufficiently attenuates the unwanted higher frequency components. In addition, the filter preferably compensates for the lamp's negative differential resistance.

The pulse signals generated at the output port of pulse width modulation module 92 drive the transistors contained in fill bridge circuit 18, which remarkably cause the full bridge circuit to generate the desired waveform required by the color mixing arrangements described above in reference with FIGS. 1 and 2. In accordance with two embodiments of the invention, two types of pulse width modulation methods are considered although the invention is not limited in scope in the type of the pulse width modulation employed by PWM module 92. The two types of modulation are preferably symmetrical and asymmetrical pulse width modulation arrangements. In either case, the voltage signal provided to PWM module 92 is a low voltage version of the desired lamp drive waveform. The output signal of the PWM module 92 is a pulse width modulated gate drive signal that operates full bridge circuit 18.

Figure 5:
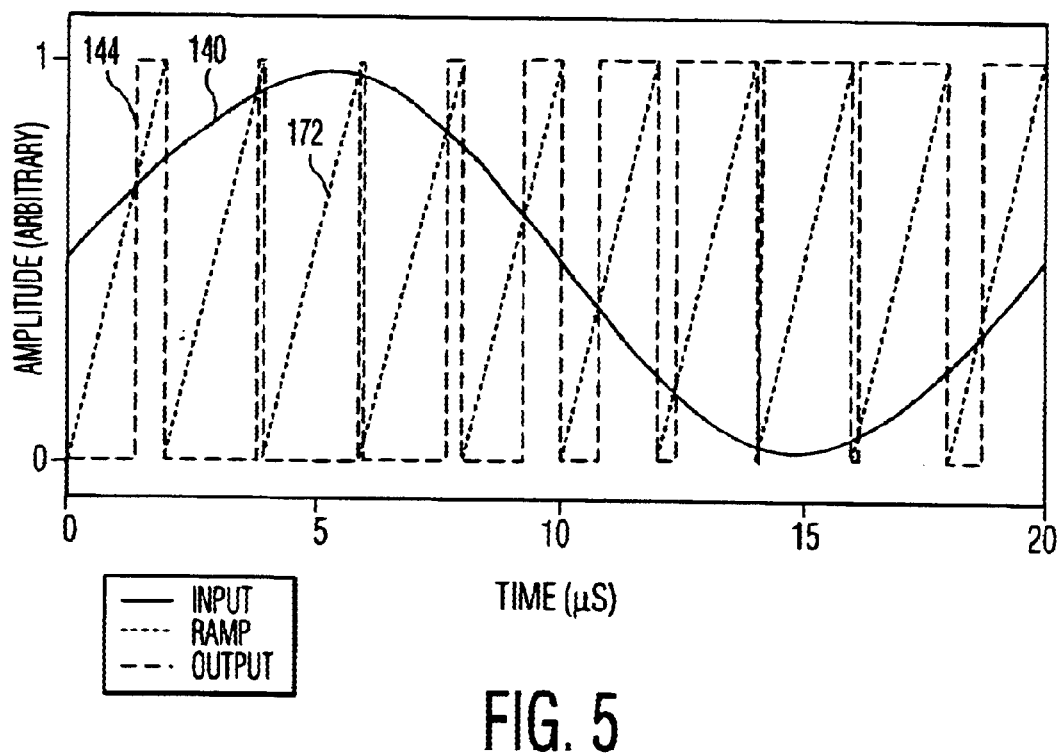
FIG. 5 illustrates a plot of an asymmetrical pulse width modulation arrangement, in accordance with one embodiment of the present invention.
Figure 6:
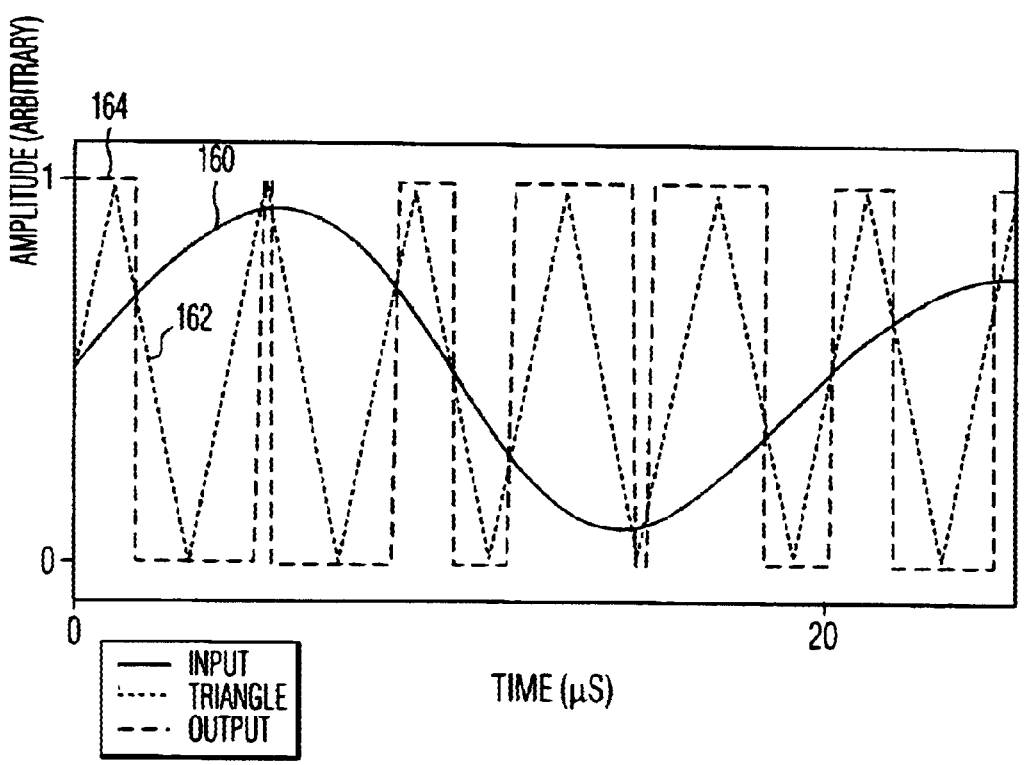
FIG. 6 illustrates a plot of a symmetrical pulse width modulation arrangement, in accordance with one embodiment of the present invention.

FIG. 5 illustrates a plot of an asymmetrical pulse width modulation arrangement. Signal curve 142 is an asymmetrical ramp signal that is internally generated by pulse width modulation (PWM) module 92. Signal curve 140 is the voltage signal provided to the input port of PWM module 92, which is the desired color mixing waveform with a dc level added equal to half the peak voltage of the ramp signal. As illustrated, during each cycle of the ramp the PWM module output signal 144 goes "high" when the ramp first equals the input signal and resets at the end of each PWM cycle when the ramp signal resets, providing the resulting output pulse signal 144. The output signal generated by bridge circuit 18 is ideally the same as the pulse signal 144 with the dc level removed and the amplitude increased. FIG. 6 illustrates a plot of a symmetrical pulse width modulation arrangement. Signal curve 162 is a symmetrical ramp signal that is internally generated by pulse width modulation (PWM) module 92 in accordance with another embodiment of the invention. Signal curve 160 is the voltage signal provided to the input port of PWM module 92, which is the desired color mixing waveform with a dc level added equal to half the triangle peak voltage so that the average pulse width is approximately 50% of the PWM period and the bridge output signal will contain no dc signal components. As illustrated the symmetrical ramp signal 162 is triangular shaped in accordance with one embodiment of the invention.

During each period of the triangular waveform the output of PWM module 92 goes "high" when the triangle first exceeds the input signal and subsequently goes low when the input signal first exceeds the triangle. The minimum pulse width produced is determined by the maximum value of the input waveform. Thus the amplitude of input signal 160, determines the range of the pulse widths used. While an ideal bridge circuit can operate with 0–100% pulse width modulation, in practice a 10%–90% modulation is the preferred range of operation.

PWM module 92 advantageously employs a symmetrical pulse width modulation arrangement as discussed in reference with FIG. 6 as a preferred mode of operation. The symmetrical method utilizes information about the input waveform signal for both the low-to-high and high-to-low output transitions, whereas the asymmetrical method only uses input information for the low-to-high transition with the high-to-low transitions occurring at the end of a PWM cycle.

Figure 7:
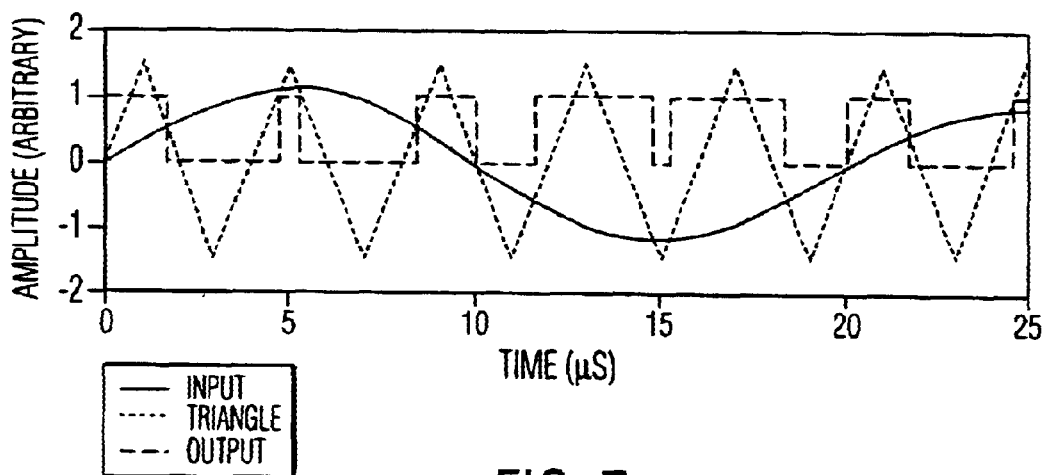
FIG. 7 illustrates signal curves corresponding to a symmetrical pulse width modulation arrangement for amplitude modulation, in accordance with one embodiment of the present invention.

FIG. 7 illustrates signal curves corresponding to a symmetrical pulse width modulation arrangement for amplitude modulation of a carrier frequency signal fixed at 50 kHz (no sweep). The input modulation index is set at 0.25 and the AM frequency is set at 24 kHz. The amplitude of the input waveform relative to the triangle amplitude is set to yield 10–90% pulse width modulation. It is noted that the PWM range is determined by the maximum and minimum values of the "inputs" signal relative to the amplitude of the "triangle" signal. From equation (1), it follows that the maximum is $A(1+m)$ and the minimum is $-A(1+m)$, wherein A is the amplitude of the carrier frequency and m is the modulation index for amplitude modulation. The value of A associated with a given PWM range is thus a function of modulation index m. The PWM rate for the example illustrated in FIG. 7 is set to 250 kHz.

Figure 8:
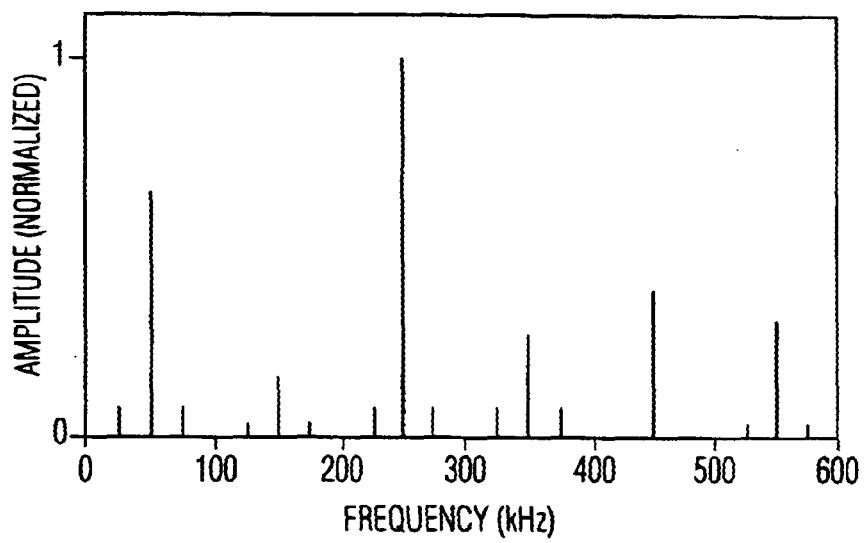
FIG. 8 illustrates a normalized voltage spectrum where the 45–55 kHz sweep is represented by a fixed 50 kHz at 250 kHz bridge operation, in accordance with one embodiment of the present invention.

FIG. 8 illustrates the normalized voltage spectrum of the resulting output signal (gate drive) waveform minus the dc component, and without the frequency sweep. As illustrated in FIG. 8, the reproduction of the desired spectrum in the 0–100 kHz range is quite satisfactory. The side band amplitudes are equal to within better than 0.1%. The ratio of side band amplitude to carrier amplitude is 0.122 compared to an input value of 0.125, an error of around −2.4%. There are unwanted frequency components that filter 86 has to deal with. For example, those components centered at around 150 kHz need to be attenuated, but are relatively close to frequency components that should not be attenuated.

Figure 9:
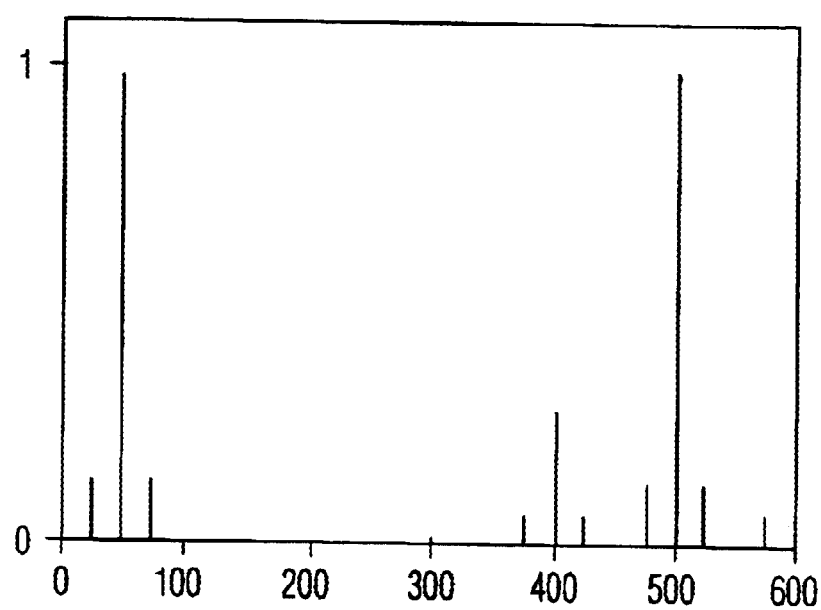
FIG. 9 illustrates a normalized voltage spectrum where the 45–55 kHz sweep is represented by a fixed 50 kHz at 500 kHz bridge operation, in accordance with one embodiment of the present invention.

FIG. 9 illustrates a frequency spectrum for an arrangement where the pulse width modulation frequency has increased to 500 kHz. The ratio of side band to carrier amplitude is now exact to three digits, i.e 0.125. The unwanted frequency components have shifted to substantially higher frequency ranges. This lessens the requirements for the filter at the cost of increased operation stress on full bridge 18. Thus in reference with the frequency ranges discussed above in reference with FIG. 2 corresponding to a color mixing arrangement of the present invention, the preferred pulse width modulation frequency is about 250 kHz or greater for a symmetrical pulse width modulation arrangement. For an asymmetrical arrangement the frequency of the pulse width modulation is preferably about 325 kHz or greater, in order for the voltage frequency spectrum of the desired waveform to exhibit acceptable characteristics in view of filter 18 considerations as discussed above with reference to FIGS. 7 and 8.

Figure 10:
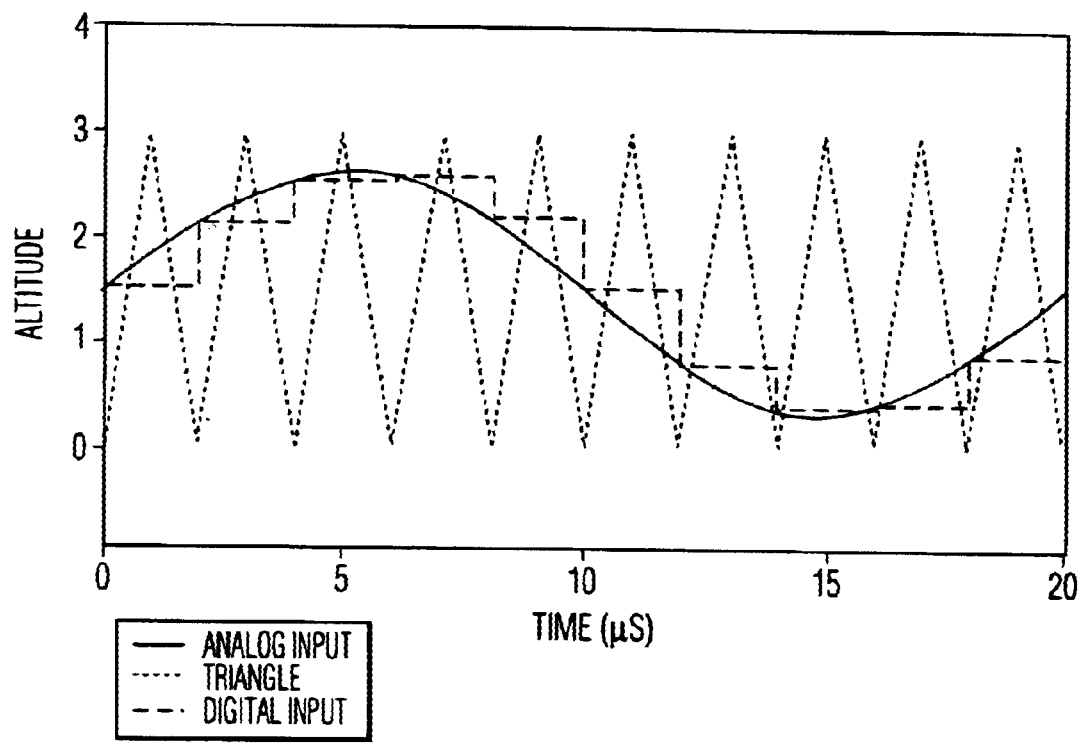
FIG. 10 illustrates a comparison of pulse signals, in accordance with one embodiment of the present invention.
Figure 11:
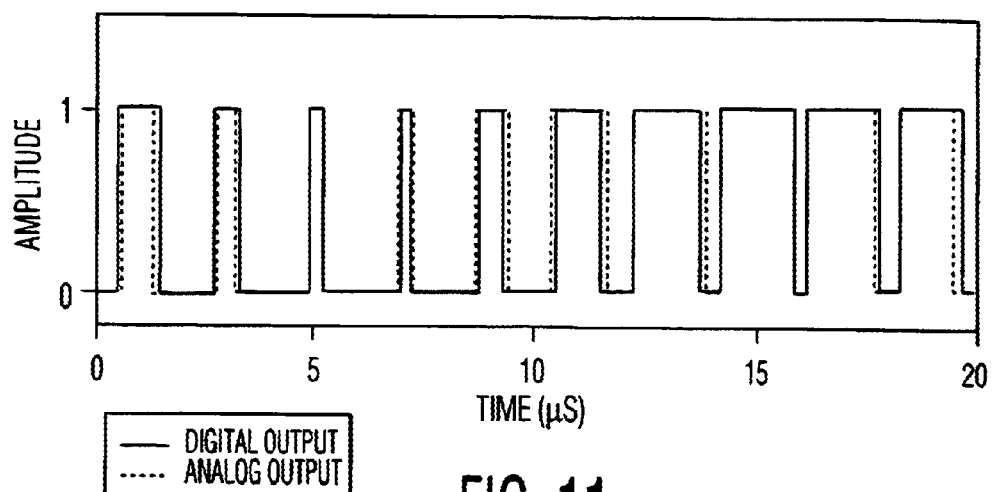
FIG. 11 illustrates a comparison of analog vs. digital pulse signals, in accordance with one embodiment of the present invention.

As noted above, the components contained in controller 20 include digital hardware instead of analog hardware in accordance with another embodiment of the invention. Thus, AM/FM signal generator 94 employs a digital signal processor that computes one value of the input waveform during each PWM cycle. This value corresponds to the amplitude of the analog input waveform at the start of the PWM cycle. This is illustrated in FIG. 10, wherein a pulse width modulation frequency of 500 kHz is employed, with a modulation index of 0.25, and 10–90% pulse width modulation width. FIG. 11 illustrates a comparison of the pulse signals generated by PWM module 92 for digital and analog arrangements. For operation values discussed above in reference with FIGS. 2, 7 and 8, a pulse width modulation rate in the range of 325 kHz to 500 kHz provides a satisfactory result for most applications. The design of filter 86 is discussed hereinafter in accordance with various embodiments of the present invention. In steady state operation, a frequency sweep of 45–55 kHz with a 24 kHz AM signal is employed. In the voltage frequency spectrum, this results in the highest frequency of 79 kHz (55 kHz+24 kHz) and a lowest frequency of 21 kHz (45 minus 24). The color mixing algorithm allows for operation with AM frequencies of 20–30 kHz and thus a total frequency range of about 15 kHz (45 minus 30) to 85 kHz (55 plus 30). The unwanted frequency components occur at frequencies as low as about 100 kHz, depending among other things, on the PWM scheme and PWM frequency. Thus, filter 86 preferable has a flat frequency response from 15 kHz to 85 kHz and is strongly attenuating by 100 kHz. The filter is preferably low order without relatively large magnetic components.

In accordance with one embodiment of the invention a filter without a flat frequency response is employed that still provides a power frequency spectrum the meets the lamp specification for proper color mixing. The series capacitor 22 is used as a dc blocking capacitor. Thus, in one example, in accordance with an embodiment of the invention inductor 24 has inductance L=1.6 mH, capacitor 26 has capacitance C=1.2 nF, capacitor 22 has capacitance Cs=2.2 $\mu$F, and equivalent resistance of lamp 14 is R=533Ω. Thus, the filter is designed such that the unloaded resonant frequency (115 kHz) is above any of the frequency components of the voltage frequency spectrum of the desired lamp drive waveform. Furthermore, one third of the resonant frequency (38.3 kHz) is located in an unused portion of the frequency spectrum, between the swept carrier frequency (45 kHz–55 kHz) and the full range of the lower AM side band during color mixing operation (15kHz–35 kHz).

Figure 12:
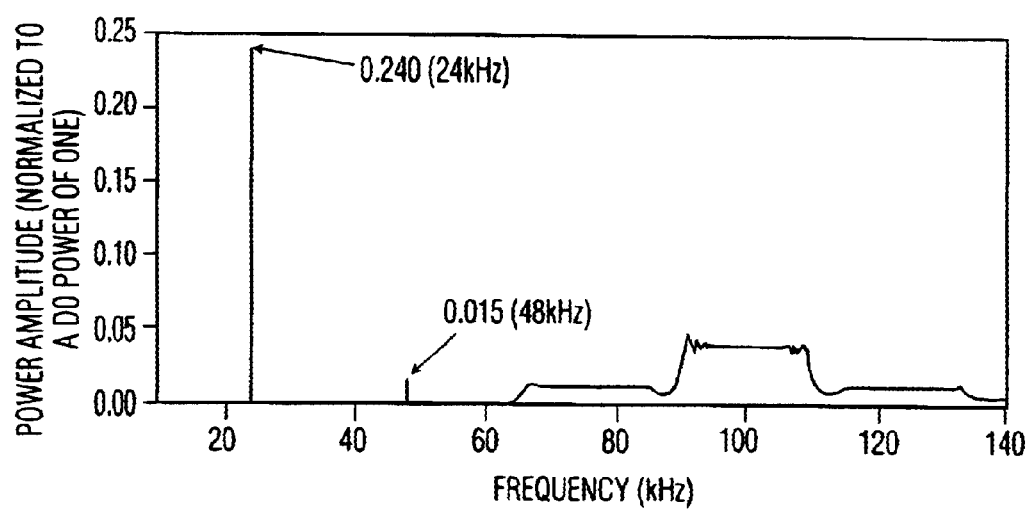
FIG. 12 illustrates a normalized power spectrum, in accordance with one embodiment of the present invention.

FIG. 12 illustrates the power spectrum normalized to a dc component of "one." With this normalization and an input m value of 0.25, the amplitude of the 24 kHz fixed frequency component should have been 0.242 as derived by $m/(1+m^2/2)$. The distortion in the voltage spectrum has caused an error of less than 1% in the m value. As the fixed frequency component is varied from 20 kHz to 30 kHz, the output amplitude at the fixed frequency varies from 0.242 at 20 kHz to 0.239 at 30 kHz, a total of about 1.3%. The power varies over the frequency sweep by about +/−6.5%. This power fluctuation may lead to a visible flicker, which according to one embodiment of the invention is corrected by providing an offsetting amplitude increase with increasing frequency over the frequency sweep. Furthermore, in accordance with another embodiment of the invention, when an increase in power to lamp 14 is desired, it is possible to increase the bus voltage in bridge circuit 18, while the modulation index m is also increased. For example, for a power requirement of 75 W, a bus voltage of around 527V and a modulation index m=0.3 would result in proper filter characteristics and satisfactory color mixing arrangement.

In accordance with another embodiment of the invention the resonant frequency is set to around 87.7 kHz and one third of the resonant frequency to 29.2 kHz. This produces among other things three desirable results. First, the transfer function assumes a high value, for example greater than one, in the frequency range of about 50 kHz. This results in lower required bus voltage $V_{bus}$ in the bridge circuit. Second, the transfer function is relatively flat in that region. Third, the attenuation of unwanted higher frequency components is relatively effective with lower bus voltages and modulation index values as compared to the design discussed in reference with FIG. 11. For example, an output power of 75W requires a bus voltage of 407 V and a modulation index m=0.28.

Thus, in accordance with various embodiments of the present invention, a system and method for providing a pulse signal to a full bridge circuit is employed that provides for acceptable color mixing arrangement in a high intensity discharge lamp.

What is claimed is:

1. A system for driving a gas discharge lamp with a desired waveform, comprising:
   a bridge circuit configured to provide a pulse voltage signal;
   a controller coupled to said bridge circuit, said controller being configured to generate a pulse width modulated signal corresponding to the desired waveform, wherein said desired waveform includes a sweeping frequency signal and a fixed frequency amplitude modulating signal, and said desired waveform is pulse width modulated at a pulse width modulation frequency to form said pulse width modulated signal corresponding to the desired waveform; and a filter circuit coupled to said bridge circuit and said gas discharge lamp and configured to receive and filter said pulse voltage signal provided by said bridge circuit.

2. The system in accordance with claim 1, wherein said controller further comprises:

an AM/FM signal generator that provides a signal having said desired waveform; and a pulse width modulation module coupled to said signal generator and configured to provide said pulse width modulated signal.

3. The system in accordance with claim 2, wherein said signal generator is a digital signal processing device.

4. The system in accordance with claim 2, wherein said pulse width modulation module operates based on a symmetrical triangle signal arrangement.

5. The system in accordance with claim 2, wherein said pulse width modulation module operates based on an asymmetrical triangle signal arrangement.

6. The system in accordance with claim 2, wherein said controller further comprises a microprocessor configured to receive measurement signals corresponding to current and voltage signals provided to said gas discharge lamp.

7. A system for driving a gas discharge lamp comprising:

a bridge circuit configured to provide a pulse voltage signal;

a controller coupled to said bridge circuit, wherein:

said controller is configured to generate a pulse width modulated signal corresponding to a desired waveform, said desired waveform includes a sweeping frequency signal and a fixed frequency amplitude modulating signal, and said controller comprises an AM/FM signal generator that provides a signal having said desired waveform, a pulse width modulation module coupled to said signal generator and configured to provide said pulse width modulated signal, and a microprocessor configured to receive measurement signals corresponding to current and voltage signals provided to said gas discharge lamp; and a filter circuit coupled to said bridge circuit and said gas discharge lamp and configured to receive and filter said pulse voltage signal provided by said bridge circuit;

wherein said signal generator provides a signal corresponding to $$A(l+m \cos w_m t) \cos W_c(t) t$$

where m is modulation index of said modulating signal, $W_m$ is the modulation frequency, $W_c(t)$ is the carrier frequency, t is time, and A is an amplitude of said modulating signal.

8. The system in accordance with claim 7, wherein said microprocessor provides values for said parameters A, m, and $W_c(t)$.

9. The system in accordance with claim 2, wherein said filter circuit is configured as a low pass filter such that a resonant frequency of said filter is larger than frequency components of voltage spectrum of said desired lamp drive waveform and one third of said resonant frequency is located in an unused region of said voltage spectrum.

10. A method for driving a gas discharge lamp comprising:

providing a pulse voltage signal for driving said gas discharge lamp, said pulse voltage signal being associated to a pulse width modulation signal corresponding to a desired waveform;

filtering said pulse voltage signal and providing said filtered pulse voltage to said gas discharge lamp; and generating said pulse width modulated signal corresponding to a desired waveform, wherein said desired waveform includes a sweeping frequency signal and a fixed frequency amplitude modulating signal, and said desired waveform is pulse width modulated at a pulse width modulation frequency to form said pulse width modulated signal corresponding to the desired waveform.

11. The method in accordance with claim 10, further comprising the steps of:

generating a signal having said desired waveform by a signal generator; and providing said signal having said desired waveform to a pulse width modulation module so as to generate said pulse width modulated signal.

12. The method in accordance with claim 11 further comprising the step of generating said signal having said desired waveform via a digital signal processing device.

13. The method in accordance with claim 11 further comprising the step of operating said pulse width modulation module based on a symmetrical ramp signal arrangement.

14. The method in accordance with claim 11, further comprising the step of operating said pulse width modulation module based on an asymmetrical ramp signal arrangement.

15. The method in accordance with claim 11 further comprising the step of receiving measurement signals corresponding to current and voltage signals provided to said gas discharge lamp.

16. The method in accordance with claim 14 further comprising the step of generating a signal corresponding to $$A(l+m \cos w_m t) \cos W_c(t) t$$

where m is modulation index of said modulating signal, $W_m$ is the modulation frequency, $W_c(t)$ is the carrier frequency, and A is an amplitude of said modulating signal.

17. The method in accordance with claim 11 wherein said filtering step further comprises the step of setting a resonant frequency of a filter circuit to be larger than frequency components of voltage spectrum of said desired lamp drive waveform and one third of said resonant frequency is located in an unused region of said voltage spectrum.

18. The system according to claim 2 wherein said sweeping frequency signal has a frequency range between the fast azimuthal acoustic resonance mode and the first acoustic resonance mode of the lamp, and the pulse width modulation frequency is at least approximately 250 kHz.

19. The system according to claim 18 wherein the amplitude modulating frequency and modulation index are controlled such that, when the lamp is operated with an arc tube in a vertical position, color mixing is obtained in the lamp output.

20. The system according to claim 19 wherein the frequency sweep covers a range of approximately 10 kHz from lowest frequency to highest frequency in approximately 10 ms.

* * * * *